(12) United States Patent
Atohira

(10) Patent No.: US 11,220,002 B2
(45) Date of Patent: Jan. 11, 2022

(54) ROBOT SIMULATION DEVICE

(71) Applicant: FANUC CORPORATION, Yamanashi (JP)

(72) Inventor: Hiroyuki Atohira, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/377,252

(22) Filed: Apr. 8, 2019

(65) Prior Publication Data

US 2019/0329405 A1 Oct. 31, 2019

(30) Foreign Application Priority Data

Apr. 25, 2018 (JP) .............................. JP2018-084152

(51) Int. Cl.
| | | |
|---|---|---|
| *G06T 17/00* | (2006.01) | |
| *B25J 9/16* | (2006.01) | |
| *G06T 19/20* | (2011.01) | |

(52) U.S. Cl.
CPC ............ *B25J 9/1605* (2013.01); *B25J 9/1664* (2013.01); *B25J 9/1689* (2013.01); *G06T 17/00* (2013.01); *G06T 19/20* (2013.01); *G05B 2219/40323* (2013.01); *G05B 2219/50391* (2013.01); *G06T 2219/2004* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,324,443 | B1* | 11/2001 | Kurakake | B25J 9/1656 318/568.24 |
| 7,225,399 | B2* | 5/2007 | Watson | G06F 40/14 715/210 |
| 2005/0024331 | A1* | 2/2005 | Berkley | G06F 3/016 345/161 |
| 2006/0152533 | A1* | 7/2006 | Read | B25J 9/1671 345/653 |
| 2006/0265664 | A1* | 11/2006 | Simons | G01S 5/0221 715/772 |
| 2008/0106488 | A1* | 5/2008 | Okuno | A63F 13/06 345/8 |
| 2009/0112540 | A1* | 4/2009 | Kessel | G06T 19/00 703/8 |
| 2010/0251114 | A1* | 9/2010 | Wehba | G06F 3/04855 715/702 |
| 2014/0207420 | A1* | 7/2014 | Edwards | G06T 19/00 703/1 |

(Continued)

FOREIGN PATENT DOCUMENTS

| | | |
|---|---|---|
| JP | H09-076063 A | 3/1997 |
| JP | H9-212228 A | 8/1997 |

(Continued)

*Primary Examiner* — Andrew G Yang
(74) *Attorney, Agent, or Firm* — Hauptman Ham, LLP

(57) ABSTRACT

A robot simulation device includes an image display unit configured to display a three-dimensional model of a robot system having a robot, a workpiece, and a peripheral device, as a pseudo three-dimensional object existing in a three-dimensional space, and a simulation execution unit configured to perform simulation operation for the three-dimensional model of the robot system displayed by the image display unit.

20 Claims, 12 Drawing Sheets

(56) References Cited

U.S. PATENT DOCUMENTS

| | | | |
|---|---|---|---|
| 2015/0379171 A1* | 12/2015 | Kuwahara | B25J 9/1605 |
| | | | 703/13 |
| 2016/0124501 A1* | 5/2016 | Lam | G06F 3/011 |
| | | | 345/156 |
| 2016/0257000 A1 | 9/2016 | Guerin et al. | |
| 2016/0332297 A1* | 11/2016 | Sugaya | G06F 3/04842 |
| 2017/0249780 A1* | 8/2017 | Slack | G06F 30/00 |
| 2017/0372139 A1* | 12/2017 | Thomasson | B25J 9/1664 |
| 2018/0231965 A1* | 8/2018 | Onoyama | G05B 19/423 |
| 2018/0257238 A1* | 9/2018 | Hashimoto | A61B 34/32 |
| 2018/0288557 A1* | 10/2018 | Najaf-Zadeh | H04N 21/21805 |
| 2018/0297202 A1* | 10/2018 | Nishitani | B25J 9/1671 |
| 2018/0322701 A1* | 11/2018 | Pahud | G06F 3/016 |
| 2019/0221037 A1* | 7/2019 | Sugaya | B25J 9/1671 |
| 2019/0275675 A1* | 9/2019 | Seno | B25J 9/06 |

FOREIGN PATENT DOCUMENTS

| | | |
|---|---|---|
| JP | 2004-243516 A | 9/2004 |
| JP | 2017-100204 A | 6/2017 |
| JP | 2017-100206 A | 6/2017 |
| JP | 2017-100234 A | 6/2017 |
| JP | 2017-519644 A | 7/2017 |

\* cited by examiner

ROBOT SIMULATION DEVICE

RELATED APPLICATIONS

The present application claims priority of Japanese Application Number 2018-084152, filed Apr. 25, 2018, the disclosure of which is hereby incorporated by reference herein in its entirety.

BACKGROUND OF THE INVENTION

1. Field of the Invention

The present invention relates to a simulation device that performs simulation of a robot.

2. Description of the Related Art

There is known so-called off-line programming for creating an operation program by performing a simulation while a robot system model including a robot model, a workpiece model, and a peripheral device model, representing a robot, a workpiece, and a peripheral device in three dimensions, respectively, is disposed in a screen (e.g., refer to JP 09-212228 A and JP 2017-519644 A).

SUMMARY OF THE INVENTION

While the off-line programming in the related art as described above has an advantage of enabling an operator to create an operation program at a place away from a production line in which a robot is disposed, the robot system model is displayed in a screen of a computer performing a simulation. Therefore, the operator is allowed, only through the screen being a two-dimensional surface, to check a state of the robot system. Thus, the off-line programming in the related art causes a problem that the operator is less likely to intuitively grasp a state of the robot system, such as being less likely to have a sense of perspective. A simulation device capable of performing a simulation so as to enable an operator to intuitively grasp a state of a robot system is required.

An aspect of the present disclosure is a robot simulation device including: an image display unit configured to display a three-dimensional model of a robot system including a robot, a workpiece, and a peripheral device, as a pseudo three-dimensional object existing in a three-dimensional space; and a simulation execution unit configured to perform simulation operation for the three-dimensional model of the robot system displayed by the image display unit.

BRIEF DESCRIPTION OF THE DRAWINGS

The objects, features and advantages of the invention will become more apparent from the following description of the embodiments in connection with the accompanying drawings, wherein.

DETAILED DESCRIPTION

Figure 1:
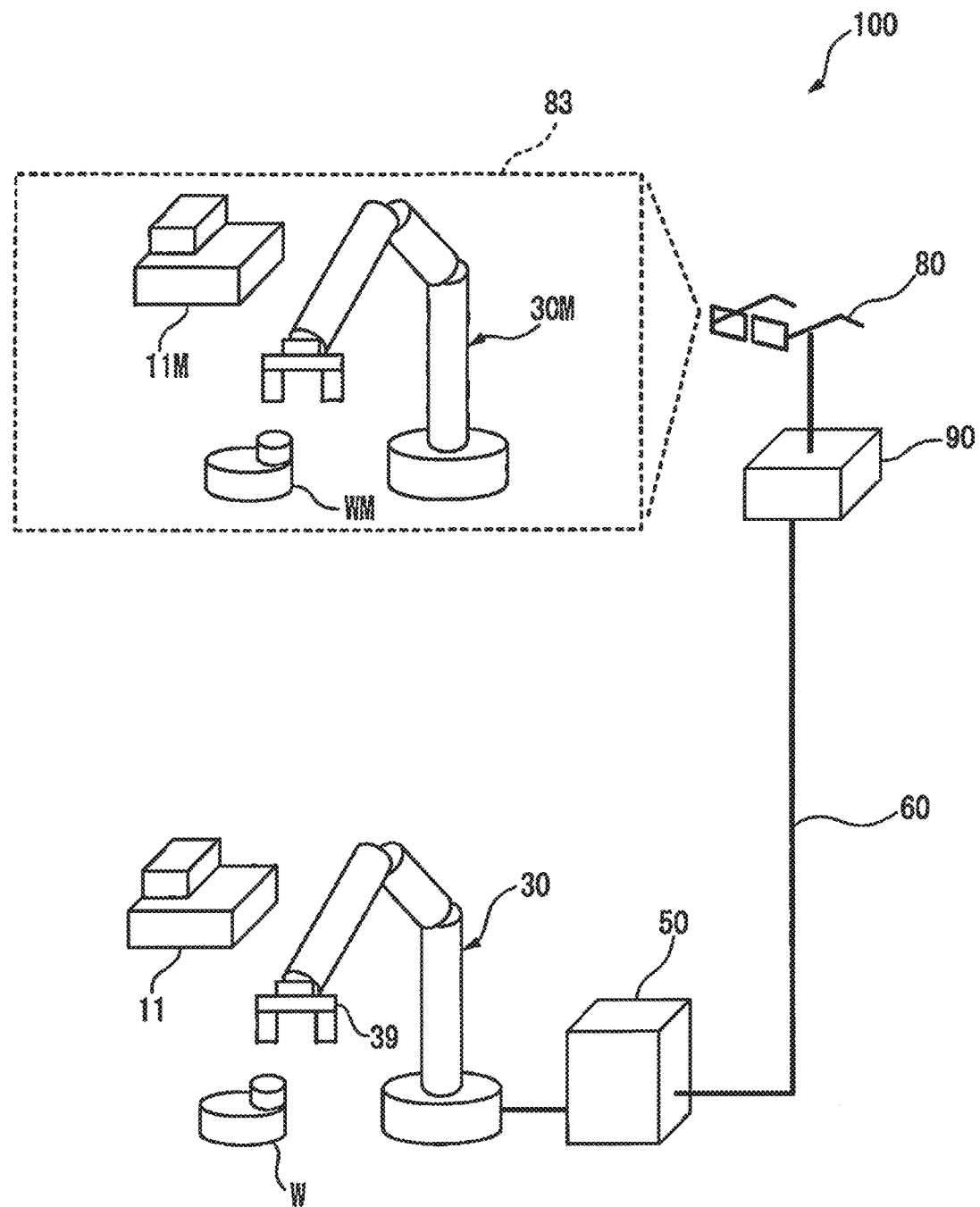
FIG. 1 is a configuration diagram illustrating an overall configuration of a robot simulation system according to an embodiment.

Embodiments of the present invention will be described below with reference to the accompanying drawings. Throughout the drawings, corresponding components are denoted by common reference numerals. To make it easy to understand the drawings, scales of the drawings are appropriately changed. Note that modes illustrated in the drawings are merely examples to implement the invention, and the invention is not limited to the modes illustrated.

FIG. 1 is a configuration diagram illustrating an overall configuration of a robot simulation system 100 according to an embodiment. As illustrated in FIG. 1, the robot simulation system 100 is configured such that a simulation system (a simulation device 90 and a head-mounted display 80) having a function of displaying and operating a three-dimensional model of a robot system while superimposing it on an image of a real space, as a pseudo three-dimensional object, using an augmented real image display function, is communicatively connected to a robot controller 50 controlling a robot 30 via a network 60. Specifically, the robot simulation system 100 includes the simulation device 90, the head-mounted display 80 connected to the simulation device 90, the robot controller 50 connected to the simulation device 90 via the network 60, and the robot 30 connected to the robot controller 50. Typically, the robot 30, a workpiece W, a peripheral device 11, and the robot controller 50 are disposed in a production line, and the simulation device 90 and the head-mounted display 80 are each disposed at a place away from the product on line.

The robot 30 is a vertical articulated robot, for example, and a hand 39 being an example of an end effector is attached to a leading end of an arm. The robot 30 is capable of transporting a workpiece W by holding it with the hand 39. Around the robot 30, the peripheral device 11 (e.g., a trolley for transporting a workpiece) and the workpiece W are disposed.

The robot controller 50 controls operation of the robot 30 by outputting a control command to a servo motor (not illustrated) that drives each joint axis of the robot 30 according to an operation program loaded in robot controller 50. The robot controller 50 also exchanges information with the simulation device 90 via the network 60.

Figure 2:
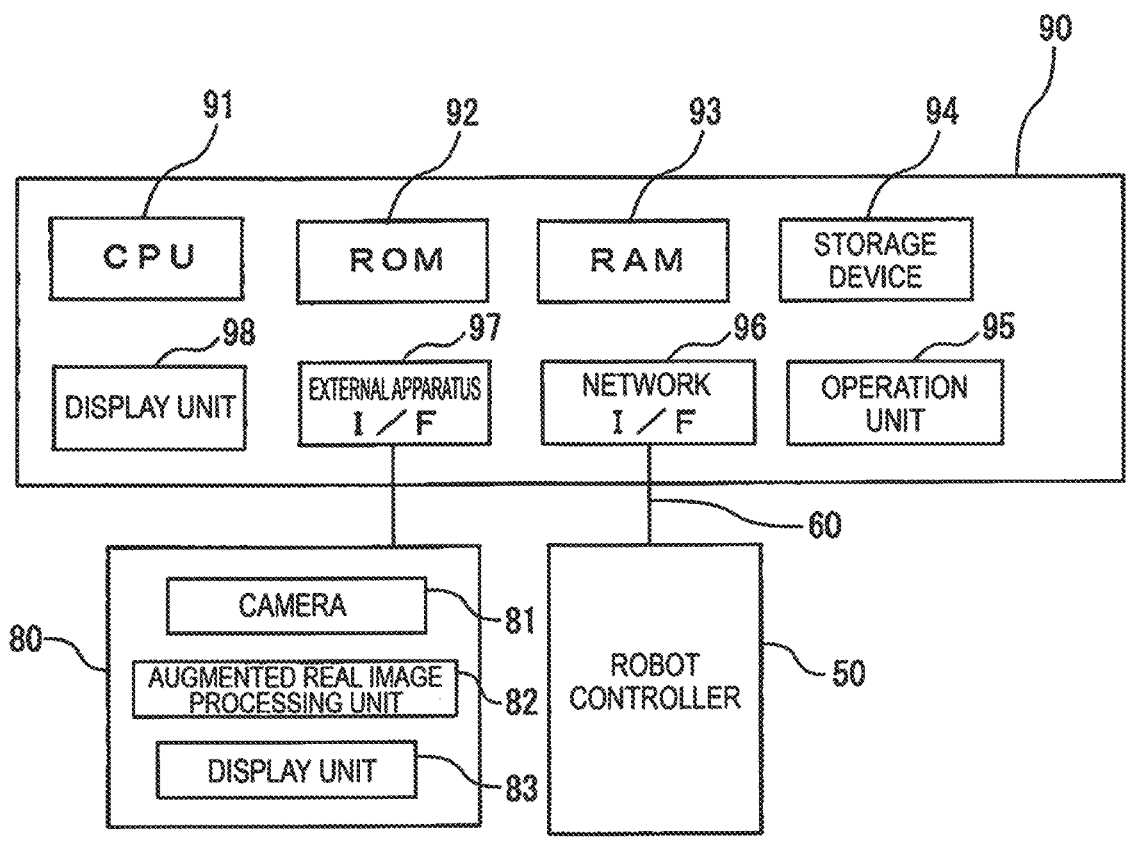
FIG. 2 is a block diagram illustrating a hardware configuration of a simulation device.

The head-mounted display 80 includes a camera 81 that photographs a real space, an augmented real image processing unit 82 that performs processing of superimposing a model of the robot system, provided from the simulation device 90, and various information items, on an image of the real space photographed by the camera 81, and a display unit 83 that displays a three-dimensional image created by the augmented real image processing unit 82 (refer to FIG. 2). The display unit 83 displays a three-dimensional image using a binocular parallax image as an example. In FIG. 1, an example of an image displayed on the display unit 83 of the head-mounted display 80 is shown in a closing line drawn using broken lines. In the example of FIG. 1, a robot model 30M, a workpiece model WM, and a peripheral-device model 11M that are respectively models of the robot 30, the workpiece W, and the peripheral device 11 are displayed on the head-mounted display 80, while being superimposed on the image of the real space. An operator can change a position of a viewpoint when an image of a model of the robot system is created, for example, by operating an operation unit 95 of the simulation device 90. The head-mounted display 80 may be replaced with an augmented reality-adaptable display of another type.

As illustrated in. FIG. 2, the simulation device 90 may be constituted by a typical computer including a CPU 91, a ROM 92, a RAM 93, a storage device 94, the operation unit 95, a network interface 96, an external apparatus interface 97 for connection to various external apparatuses, a display unit 98, and the like. The storage device 94 stores a simulation program for performing a simulation, three-dimensional model data on the robot model 30M, the workpiece model WM, the peripheral-device model 11M, and the like. The simulation device 90 is connected to the head-mounted display 80 via the external apparatus interface 97, and is also connected to the robot controller 50 via the network interface 96. The simulation device 90 may be connected to the head-mounted display 80 with wired connection or wireless connection. The simulation device 90 also may be connected to the robot controller 50 with wired connection or wireless connection.

Figure 3:
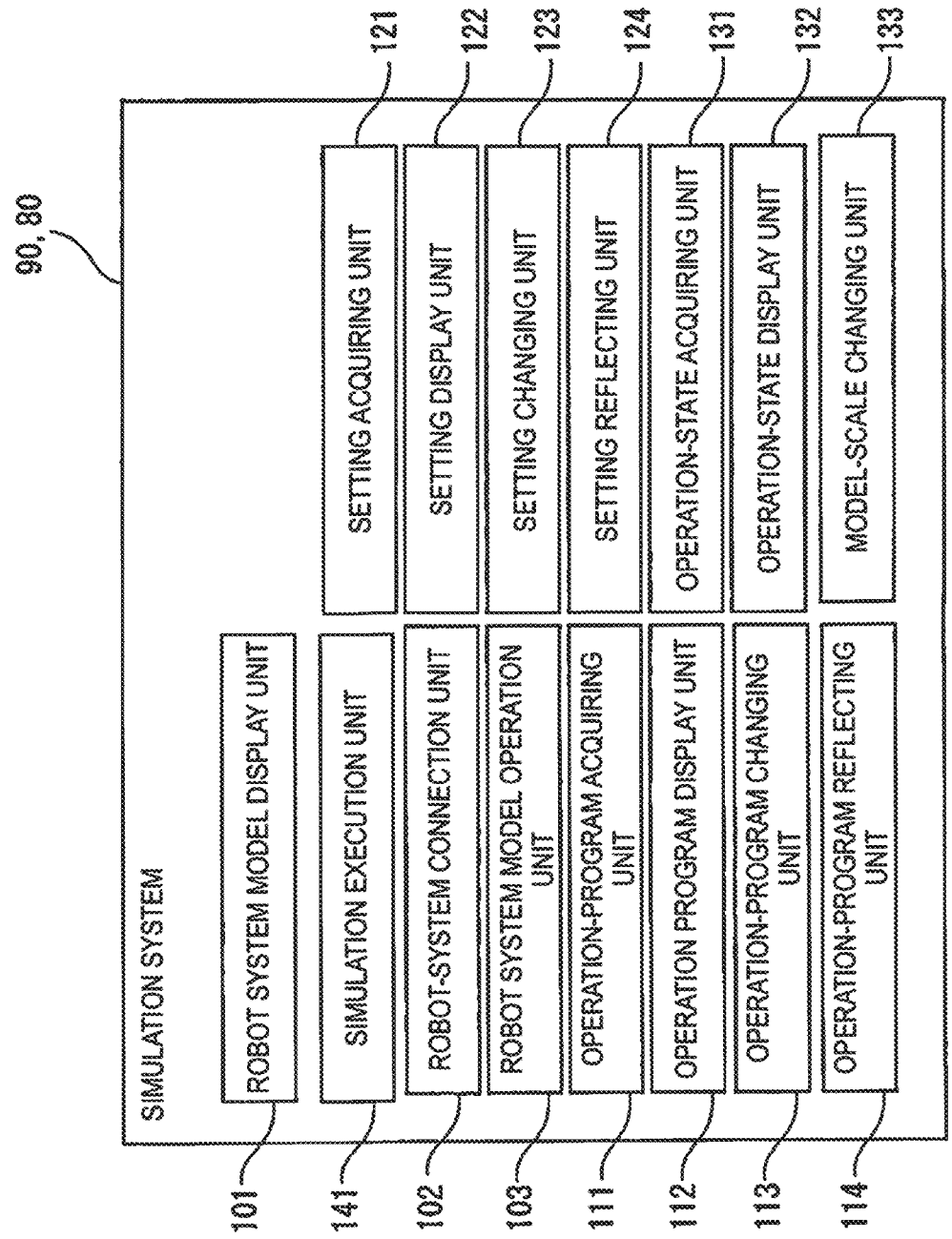
FIG. 3 is a function block diagram illustrating functions to be achieved by performing a simulation in the simulation device.

FIG. 3 is a function block diagram illustrating various functions related to a simulation to be achieved by co-operation of the simulation device 90 and the head-mounted display 80. The simulation program may be stored in various types of computer-readable recording media (e.g., a ROM, a RAM, a flash memory, an HDD, a CD-ROM, a DVD-ROM, and the like).

A robot system model display unit 101 three-dimensionally superimposes the robot model 30M, the workpiece model WM, and the peripheral-device model 11M on an image of a real space, displayed in the display unit 83 of the head-mounted display 80, using a positional relationship identical to an actual positional relationship of the robot system. For example, by letting an operator input actual positional information of the robot system using the operation unit 95 of the simulation device 90, or by causing the simulation device 90 to acquire the actual positional information of the robot system from an external device, the robot system model display unit 101 is able to display, in the image of the real space, a model of the robot system with superimposed display at a position corresponding to the actual positional relationship of the robot system. This allows each model to be displayed in a field of view of the operator wearing the head-mounted display 80 as if the robot system provided in a production line is disposed in a space where the operator is present.

A simulation execution unit 141 performs simulation operation by operating the models of the robot system displayed by the robot system model display unit 101 in a simulated manner. In the present specification, the simulation operation means that a model is operated in a simulated manner according to an operation program or instruction input of teaching points performed by an operator. For example, an operator may input desired operation (teaching points) of a robot to the simulation device 90 and may check the operation of the robot by performing the simulation operation. An operation program for allowing the robot 30 to perform the desired operation is thus created by performing the simulation operation as described above. At this time, the operator can check input of the teaching points and operation of the robot 30 and the like while viewing the models of the robot system displayed in three dimensions with superimposed display in the image of the real space where the operator wearing the head-mounted display 80 is present. That is, the operator can input, the teaching points and check operation of the robot 30 while intuitively grasping an actual state of the robot system (e.g., distances among the robot 30, the peripheral device 11, and the workpiece W), and thus an accurate operation program can be created.

The operator may operate the operation unit 95 (e.g., a keyboard, a mouse, and another pointing device) of the simulation device 90 to perform input operation such as input of the teaching points in the simulation operation as described above. Alternatively, to the simulation device 90, a sensor for tracking movement of hands of an operator (a camera, a sensor worn in a hand of an operator, or the like) known in the art may be connected as an external apparatus. The camera as a sensor for detecting movement of hands of an operator may be provided in the head-mounted display 80. When the simulation device 90 has a function of tracking movement of hands of an operator as described above, the operator can instruct input of the teaching points, or the like, with a gesture. Various types of operation input described below (touch operation, drag operation, and the like) may be each achieved by a function of tracking movement of hands of an operator.

A robot-system connection unit 102 establishes communication between the simulation device 90 and the robot controller 50. This enables information to be exchanged between a simulation-program side (simulation device 90) and a robot-system side (robot controller 50).

Figure 6:
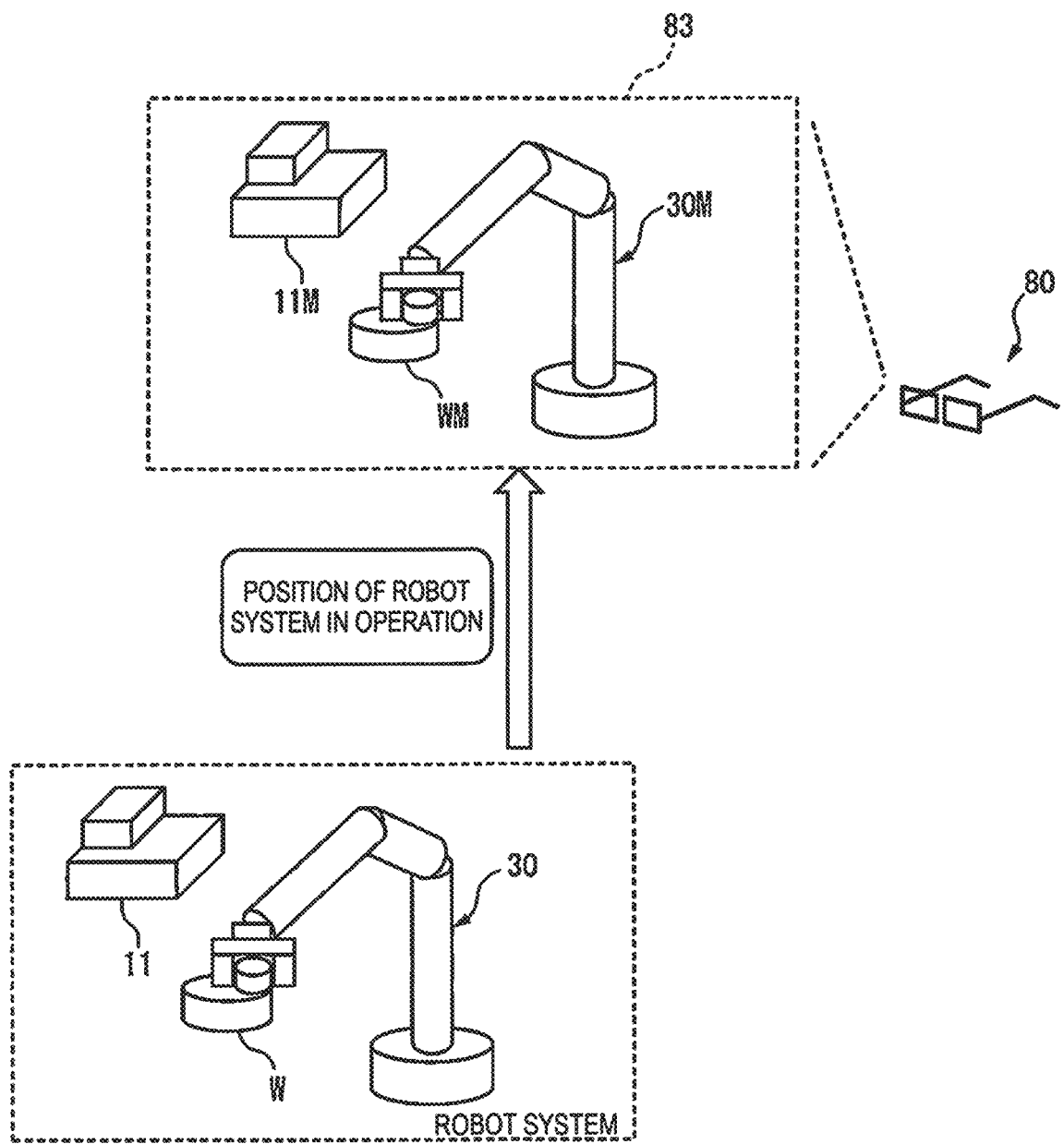
FIG. 6 is a configuration diagram illustrating a state where positions of the robot system in operation are reflected in operation of a model of the robot system.

A robot system model operation hit 103 acquires positions of the robot 30, the workpiece W, and the peripheral device 11, constituting the robot system, in operation, from the robot controller 50 to move the robot model 30M, the workpiece model WM, and the and peripheral-device model 11M, constituting the robot system model, to positions corresponding to the positions thereof in operation. The simulation device 90 receives a signal indicating a state of the hand 39 of the robot 30 to cause a hand portion of the robot model 30M to hold the workpiece model WM when the robot 30 holds the workpiece W with the hand 39. The moving processing described above may be performed so as to track movement on the robot-system side in real time. FIG. 6 illustrates a state where the robot model 30M holds the workpiece WM in an image displayed in the head-mounted display 80 in response to the robot 30 holding the workpiece W on the robot-system side.

An operation-program acquiring unit 111 acquires an operation program of the robot 30 from the robot controller 50 via the network 60.

Figure 7:
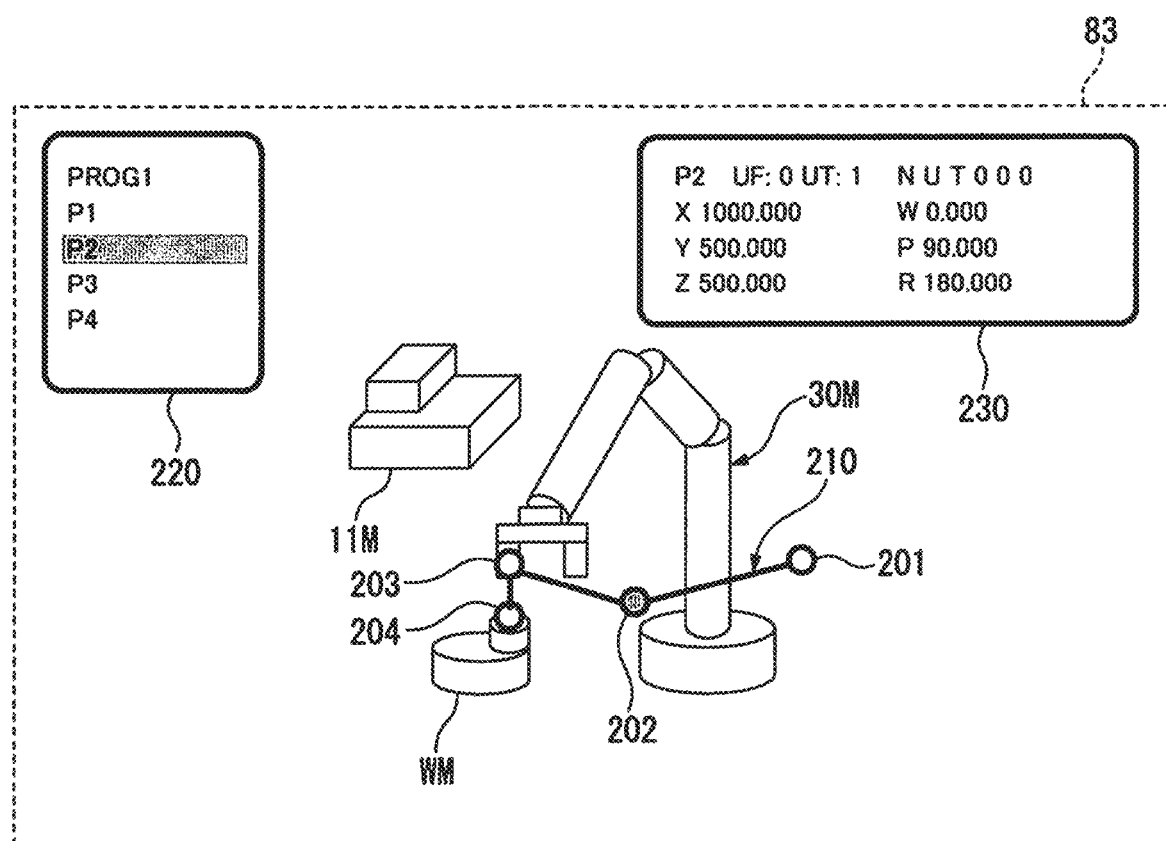
FIG. 7 is a diagram illustrating an example of a display screen in which teaching points are displayed while being superimposed on the model of the robot system.

An operation program display unit 112 displays information on the operation program of the robot 30 by superimposing it on the image of the real space displayed in the head-mounted display 80, using the operation program acquired. FIG. 7 illustrates an example of information on the operation program displayed in the head-mounted display 80. In the display example of FIG. 7, a three-dimensional image graphically showing nodes 201 to 204 of respective teaching points included in the operation program, and a path 210 connecting between the corresponding teaching points, are displayed by being superimposed on the image of the real space. In addition, a three-dimensional panel 220 showing a list of teaching points is displayed in the display example of FIG. 7. In this screen, when an operator moves his/her hand to touch and select a desired teaching point in the panel 220, or touches a node 202 of the teaching point with his/her hand, for example, a panel 230 showing a three-dimensional position of the selected teaching point is displayed by being superimposed on the image of the real space. In the example of FIG. 7, a teaching point 202 (a teaching point P2 in the panel 220) is selected. In description be low, display contents such as various operation panels and operation menus are also displayed as a three-dimensional image.

Figure 8:
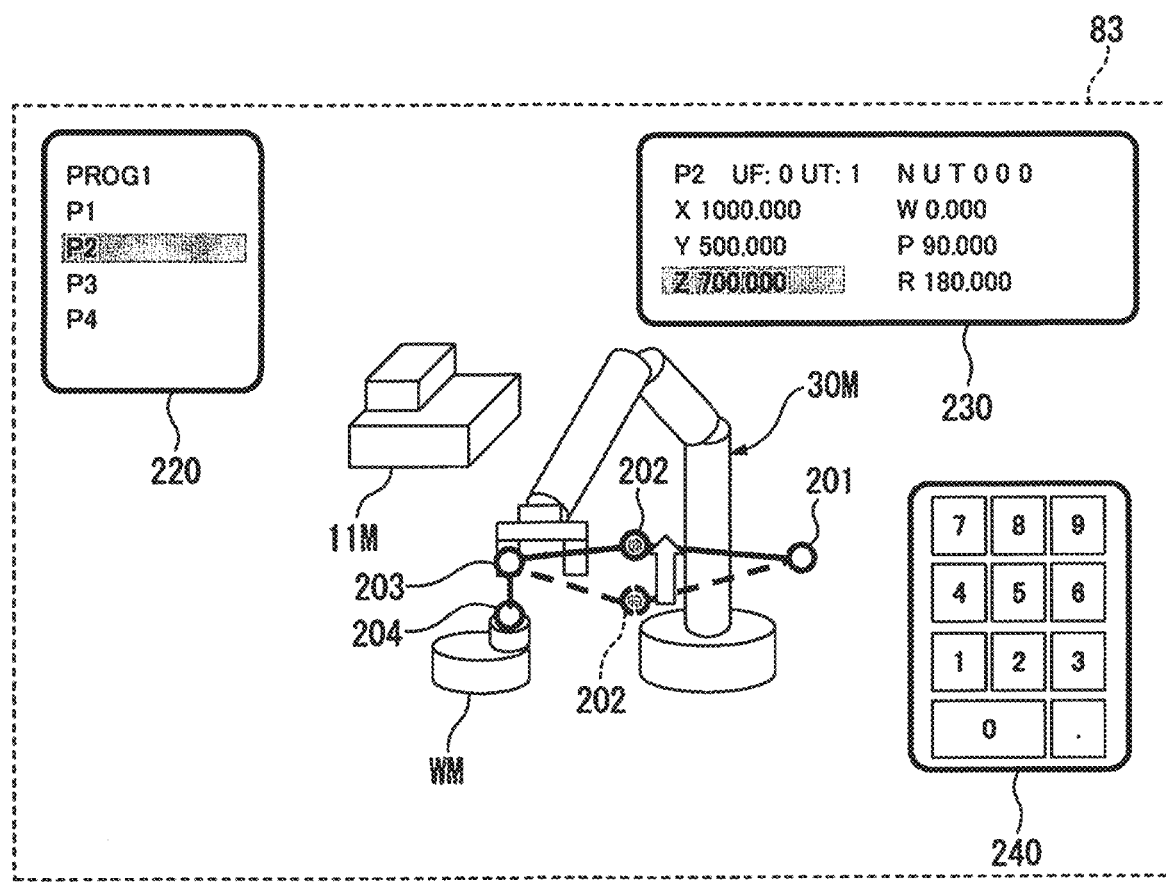
FIG. 8 is a diagram illustrating a state where operation of changing the teaching points is performed in the display screen of FIG. 7.

An operation-program changing unit 113 receives operation for changing teaching points performed by an operator. As an example of the operation for changing teaching points, the operator may move a node of each teaching point superimposed on the image of the real space by performing a drag operation with his/her hand. FIG. 8 illustrates a state where an operator moves the node 202 of the teaching point by performing a drag operation. Another example of operation for changing teaching points may be configured such that when an operator touches one of positional information items in the panel 230, indicating a three-dimensional position of a teaching point, with his/her hand, a numeric keypad 240 is displayed in the real space to allow the operator to operate the numeric keypad 240 to input a numeric value of the touched positional information. The example of FIG. 8 illustrates a state where a Z-coordinate in the panel 230, indicating a three-dimensional position of a teaching point, is selected by performing a touch operation and thereby the numeric keypad 240 is displayed.

An operation-program reflecting unit 114 transmits an operation program changed by the operation-program changing unit 113 and an implement command to the robot controller 50 via the network 60 to reflect them in the robot-system side. After this, the robot controller 50 having received the changed operation program controls the robot 30 according to the changed operation program. According to the configuration described above, when the actual operation of the robot 30 is different from a desired operation due to, for example, an external factor (e.g., when a safety monitoring device provided in the robot 30 detects a human and thereby the operation speed of the robot 30 is reduced), in a situation where the robot 30 is actually operated according to the operation program created in the simulation of FIG. 4, an operator can change the operation program while intuitively and accurately grasping a state of the robot 30.

Figure 9:
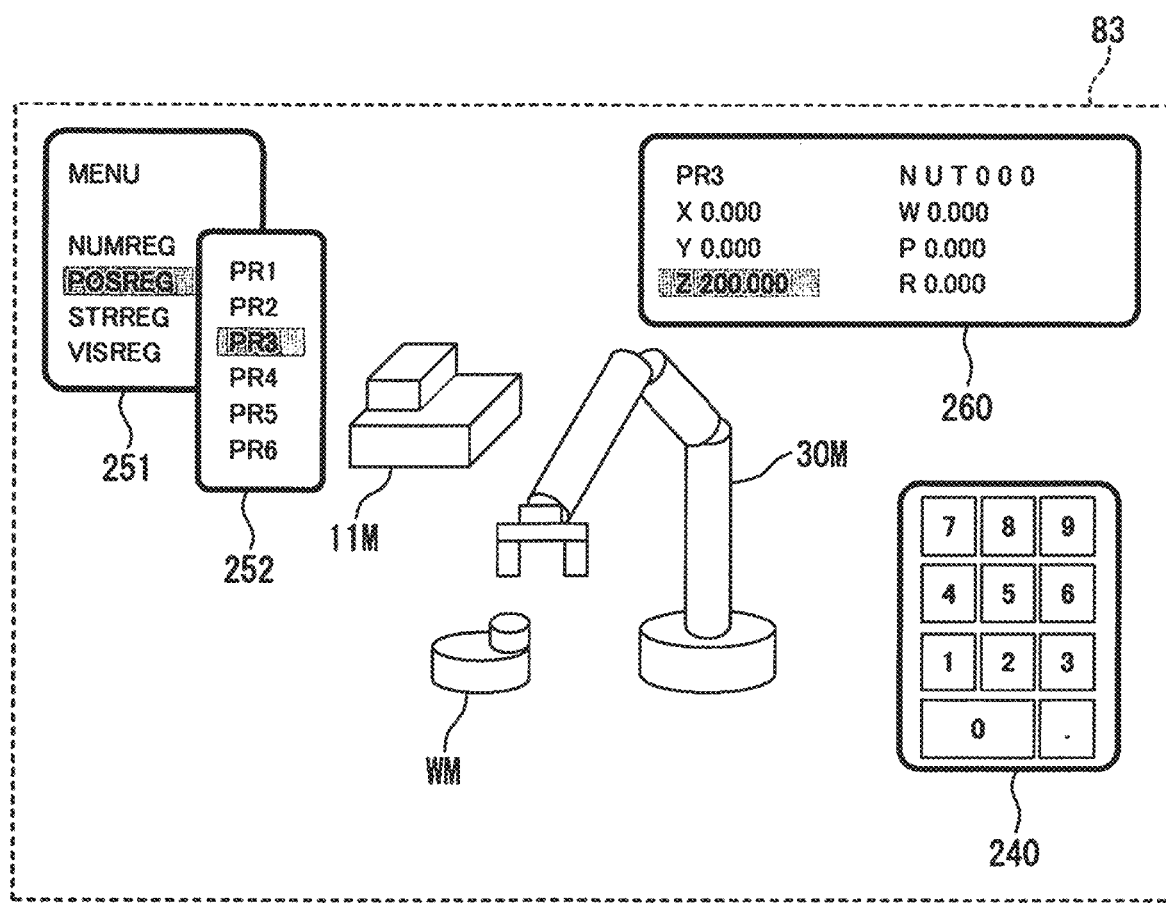
FIG. 9 is a diagram illustrating an example of a display screen in which setting information is displayed along with the model of the robot system.

A setting acquiring unit 121 acquires setting of the robot system from the robot-system side via the network 60. A setting display unit 122 displays setting information acquired by the setting acquiring unit 121 by superimposing it on the image of the real space displayed in the head-mounted display 80. For example, the setting information includes a position register (a register designating a position of a robot) and a numeric-value register (various registers used in operation of a program). FIG. 9 illustrates an example of the setting information displayed by being superimposed on the image of the real space. In the example of FIG. 9, "POSREG" represents the position register, and "NUMREG" represents the numeric value register. In FIG. 9, a setting menu panel 251 indicating a menu of the setting information is displayed.

A setting changing unit 123 receives an operation of changing the setting information. FIG. 9 also illustrates an example of the operation of changing the setting information. In the example of FIG. 9, the setting changing unit 123 displays a sub menu 252 showing a list of position registers when an operator selects the position register ("POSREG") in the setting menu panel 251. When a position register PR3 is selected in the sub menu 252, the setting changing unit 123 displays a panel 260 showing setting information on the position register PR3 by superimposing it on the image of the real space. The setting changing unit 123 displays the numeric keypad 240 by superimposing it on the image of the real space when an operator touches and selects positional information in the panel 260, and receives input of a numeric value of the selected positional information. The example of FIG. 9 illustrates a state where the numeric keypad 240 is displayed when a Z-coordinate in the panel 260 is selected by touch operation.

A setting reflecting unit 124 reflects the setting information changed by the setting changing unit 123 and a changing command in the robot-system side, by transmitting them to the robot controller 50 via the network 60. The robot controller 50 having received the changed setting information changes setting according to changed setting contents.

Figure 10:
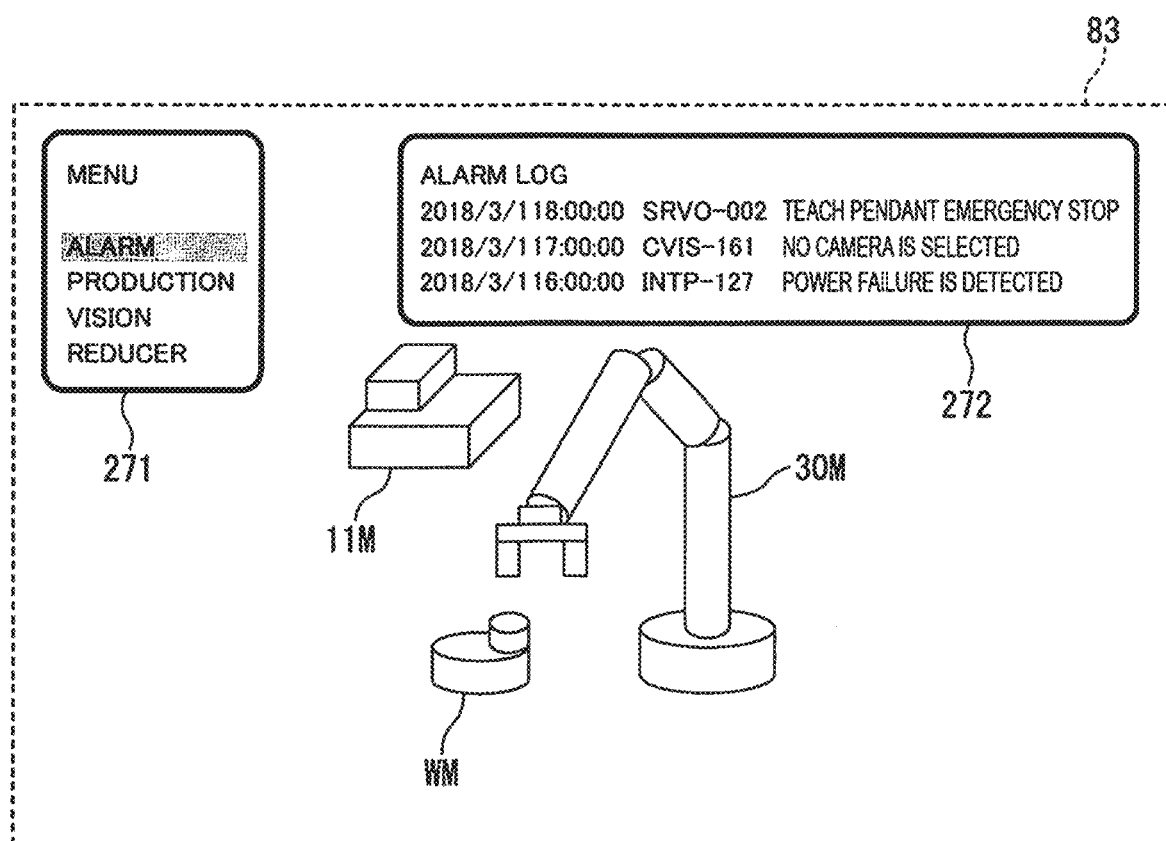
FIG. 10 is a diagram illustrating an example of a display screen in which information on operation states is displayed along with the model of the robot system.

An operation-state acquiring unit 131 acquires operation states of the robot system from the robot controller 50 via the network 60. The operation states include information on an alarm, a production state, a detection result acquired by a camera provided in a robot, a state of a speed reducer (reduction gear), and the like, for example. An operation-state display unit 132 displays information on the operation states by superimposing it on the image of the real space displayed in the head-mounted display 80. FIG. 10 illustrates an example of the operation states displayed by being superimposed on the image of the real space. In the example of FIG. 10, a menu panel 271 showing a menu of the operation states is displayed. When an operator touches and selects one of items in the menu panel 271, the operation-state display unit 132 displays a panel 272 showing details of the selected item by superimposing it on the image of the real space. In the example of FIG. 10, an alarm ("ALARM") is selected from the menu panel 271 to display information showing a log of the alarm in the panel 272.

A model-scale changing unit 133 provides a function of changing a scale of a display of each of the models of the robot system. For example, the model-scale changing unit 133 may change a scale of each of the models by receiving operation input to the robot simulation device 90 performed by an operator, or receiving a gesture operation performed to an operation menu displayed in the real space.

Figure 4:
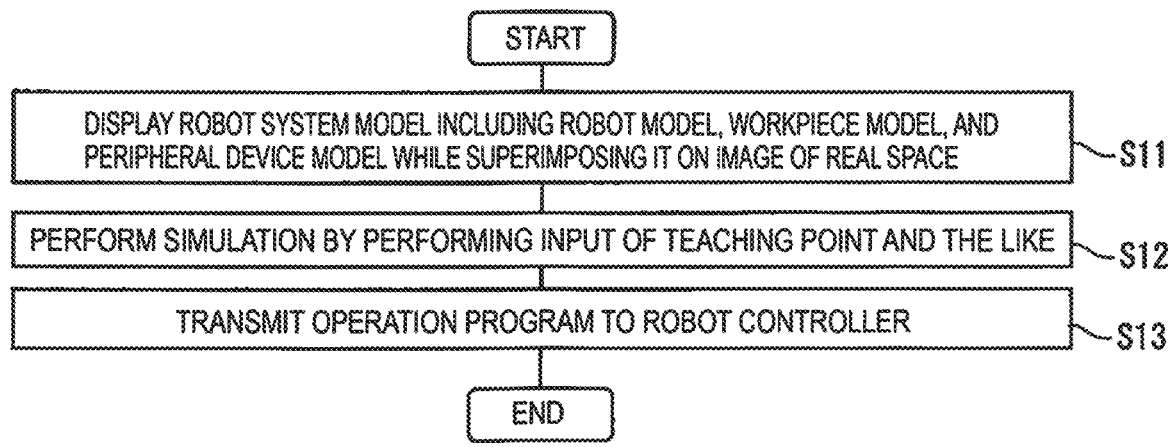
FIG. 4 is a flowchart illustrating simulation operation of a robot.

FIG. 4 is a flowchart illustrating operation according to a simulation program for creating the operation program of the robot 30. The simulation operation of FIG. 4 is performed under control of the CPU 91 of the simulation device 90. First, by the function of the robot system model display unit 101, three-dimensional models of the robot model 30M, the workpiece model WM, and the peripheral device 11M are displayed by being superimposed on the image of the real space displayed in the display unit 83 of the head-mounted display 80 (step S11). Next, by the function of the simulation execution unit 141, simulation operation of each of the models of the robot system is performed (step S12). Specifically, an operator here inputs teaching points to cause the robot 30 to perform desired operation, and executes the simulation by operating the models of the robot system in a simulated manner. In this case, the operator can perform an input operation while intuitively grasping a state of each of the models of the robot system displayed in the head-mounted display 80, as described above. When the operation program of causing the robot 30 to perform the desired operation is created as described above, the operation program is transmitted to the robot controller 50 (step S13). The robot controller 50 having received the operation program executes the operation program to control the robot 30.

Figure 5:
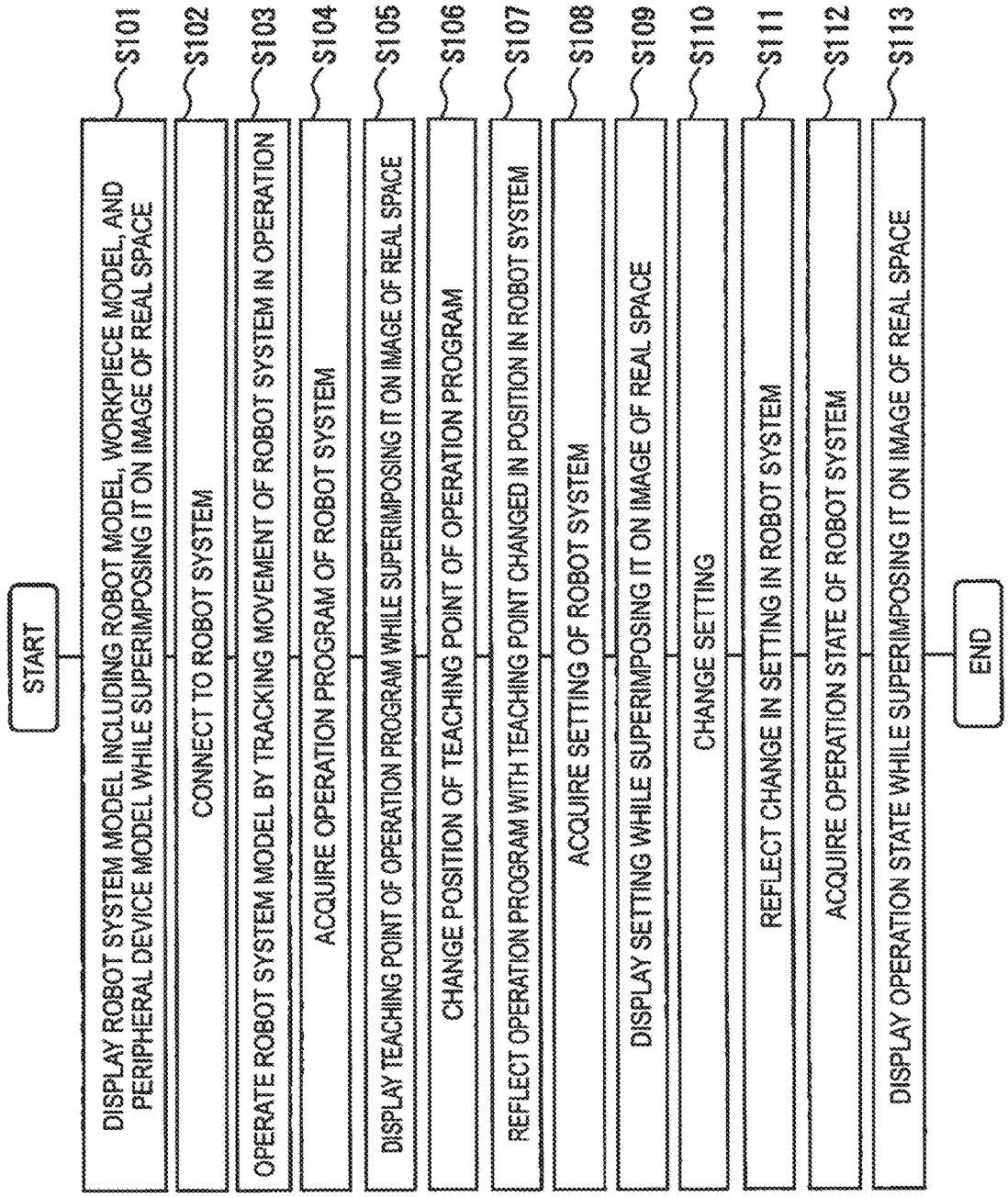
FIG. 5 is a flowchart illustrating performing a simulation while connecting to a robot system.

FIG. 5 is a flowchart illustrating simulation operation that enables the simulation device 90 to change the operation program by checking actual movement of the robot system. The simulation operation of FIG. 5 is performed under control of the CPU 91 of the simulation device 90. When the simulation device 90 is operated to start the simulation operation, first, the robot system model display unit 101 displays the robot system model including the robot model 30M, the workpiece model WM, and the peripheral-device model 11M, according to actual arrangement thereof while superimposing the robot system model on the image of the real space displayed in the head-mounted display 80 (step S101). Next, the robot-system connection unit 102 connects a simulation-system side to the robot-system side (step S102).

Subsequently, the robot system model operation unit 103 operates the robot system model according to the movement of the robot system, using positional information on the robot system in operation acquired from the robot controller 50 (step S103). In this case, an operator can view an image which enables the operator to feel as if the models of the robot system displayed in three dimensions actually operate in the real space where the operator is present, so that a state of the robot system can be intuitively grasped.

Subsequently, the operation-program acquiring unit 111 acquires the operation program of the robot system (step S104). Then, the operation program display unit 112 displays the teaching points of the operation program while superimposing them on the image of the real space, as illustrated in FIG. 7 as an example (step S105). In this state, the operation-program changing unit 113 receives an operation for changing positions of the teaching points, as illustrated in FIG. 8 (step S106). In step S106, the robot model 30M may be operated in a simulated manner according to the changed teaching points to check movement thereof. When the teaching points are changed, the operation-program reflecting unit 114 transmits the changed operation program to the robot controller 50 to reflect the changed operation program in the robot system (step S107). According to the configuration described above, the teaching points are displayed in three dimensions along with the models of the robot system superimposed on the image of the real space, so that an operator can intuitively grasp positions of the respective teaching points and can appropriately make a necessary change to the teaching points.

Subsequently, the setting acquiring unit 121 acquires setting information on the robot system (step S108). The setting display unit 122 displays the acquired setting information while superimposing it on the image of the real space (step 109). Next, the setting changing unit 123 receives operation for changing setting from an operator (step S110). When the setting is changed, the setting information changed by the setting reflecting unit 124 is transmitted to and reflected in the robot controller 50 (step S111). According to the configuration described above, the setting information is displayed along with the models of the robot system superimposed on the image of the real space, so that an operator can make a necessary change to the setting in a situation where the operator can intuitively grasp a state of the robot system.

Subsequently, the operation-state acquiring unit 131 acquires the operation state of the robot system (step S112). When the operation state is acquired, the operation-state display unit 132 displays the operation state of the robot system so as to be superimposed on the image of the real space displayed in the head-mounted display 80, as exemplified in FIG. 10 (step S113). When the operation state is displayed along with the models of the robot system displayed in the real space as described above, advantages that an operator is able to intuitively grasp a state of the robot system can be further enhanced.

As described above, according to the present embodiment, the simulation can be performed in a situation where an operator is able to intuitively grasp a state of the robot system.

While the invention has been described with reference to the specific embodiment, it will be understood, by those skilled in the art, that various changes or modifications may be made thereto without departing from the scope of the following claims.

Although, in the above described embodiment, the model of the robot system is displayed while being superimposed on the image of the real space in the display unit 83 of the head-mounted display 80 as a pseudo three-dimensional object, the present invention is not limited to an example as described above. The model of the robot system may be displayed in a display unit of the head-mounted display as a pseudo three-dimensional object existing in a virtual space.

For example, the head-mounted display 80 described above may include a camera-position-orientation estimating function (detecting unit) of estimating a position and an orientation of the camera 81 using a sensor (a gyro sensor, an acceleration sensor, etc.). By using the camera-position-orientation estimating function described above, it becomes possible to change the position of a viewpoint for creating an image of the models of the robot system while tracking movement of a head of an operator. For example, an image can be created not only such that the models of the robot system come close to an operator when the operator moves by walking in a place where the operator present, but also such that an operator can look into a desired portion of the models of the robot system by moving his/her head.

When the peripheral device 11 performs operation of conveying a workpiece and the robot controller 50 can provide information showing an operation state of the peripheral device to the simulation device 90, the simulation device 90 may use such information to create an image in which the models of the robot system are moved.

Figure 11:
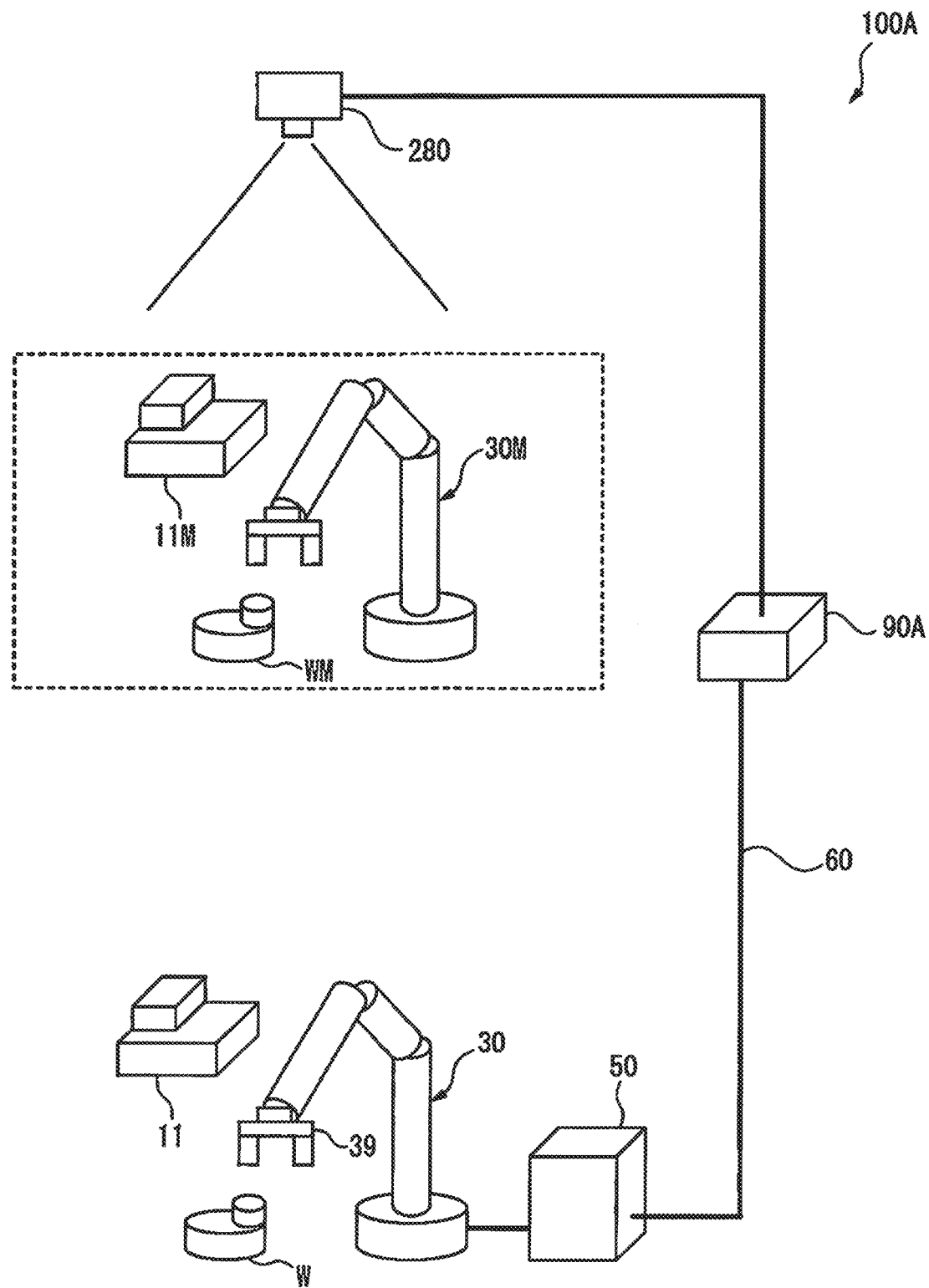
FIG. 11 is a configuration diagram illustrating an overall configuration of a robot simulation system in which a projector is used as a display device.

Examples of a technique of displaying the model of the robot system as a pseudo three-dimensional object existing in a three-dimensional space may include various techniques other than the technique in the embodiment described above. FIG. 11 illustrates a configuration example of a robot simulation system 100A in which a projector 280 is used in place of the head-mounted display 80 in the configuration of FIG. 1. In the configuration example of FIG. 11, a simulation device 90A causes a projector 280 to display, as a three-dimensional stereoscopic image, a three-dimensional model of a robot system in a real space viewed from an operator. For example, the projector 280 may display a three-dimensional stereoscopic image by using a hologram at a predetermined position in a place where an operator is present. Such a three-dimensional stereoscopic image is a stereoscopic image of an object that can be acquired by irradiating a medium (hologram) such as a film, on which interference fringes generated by superposing reference light on light from the object (object light) are recorded, with the reference light. As the projector 280, an apparatus having a function of projecting a hologram, using a technique known in the art, may be used. The simulation device 90A has functions similar to those of the simulation device 90 described in the above-mentioned embodiment. Such a configuration also enables an operator to input teaching points and to perform a simulation operation while intuitively grasping a state of the models of the robot system (a sense of distance between the robot 30 and the workpiece W or the peripheral device 11, etc.).

Figure 12:
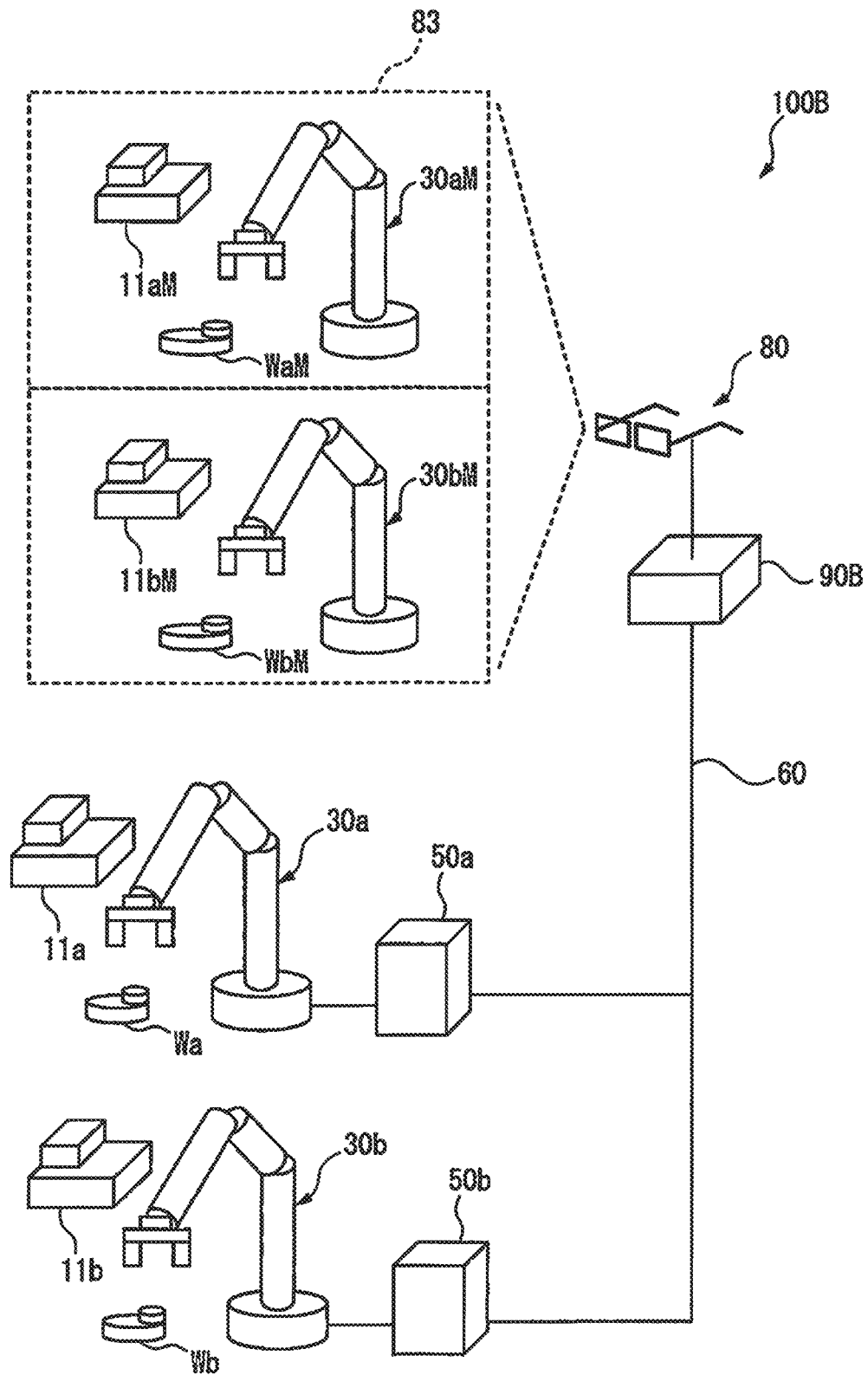
FIG. 12 a diagram illustrating a configuration example in which a plurality of robot systems is connected to a simulation device.

FIG. 12 illustrates a configuration example of a robot simulation system 100B in which a plurality of robot systems is connected to a robot simulation device 90B via the network 60. In the configuration of FIG. 12, the robot simulation device 90B can display models of each of the plurality of robot systems while superimposing them on an image of a real space, and can perform the simulation shown in FIGS. 3 and 4 for each of the plurality of robot systems. In the example of FIG. 12, the simulation device 90B is connected to two robot systems (a system including a robot controller 50a, a robot 30a, a workpiece Wa, and a peripheral device 11a, and a system including a robot controller 50b, a robot 30b, a workpiece Wb, and a peripheral device 11b). In addition, the display unit 83 of the head-mounted display 80 displays two sets of models of the robot system (models of a robot system of a robot 30aM, a workpiece WaM, and a peripheral device 11aM, and models of a robot system of a robot 30bM, a workpiece WbM, and a peripheral device 11bM) while superimposing them on the image of the real space (refer to the inside of closing lines indicated by broken lines in FIG. 12). In the configuration of FIG. 12, the simulation device 90B has functions similar to those of the simulation device 90 described in the above-mentioned embodiment. The configuration of FIG. 12 enables an operator to perform simulation operation of each of the robot systems in a place where the operator is present while intuitively grasping a state of each of the plurality of robot systems.

To solve the problem of the present disclosure, various aspects and effects thereof as described below can be provided. Numbers in parentheses in the description of the aspects corresponds to the corresponding reference numerals of the drawings of the present disclosure.

For example, a first aspect of the present disclosure is a robot simulation device including: an image display unit (101) that displays a three-dimensional model of a robot system including a robot (30), a workpiece (W), and a peripheral device (11), as a pseudo three-dimensional object existing in a three-dimensional space; and a simulation execution unit (141) that performs simulation operation for the three-dimensional model of the robot system displayed by the image display unit (101).

According to the first aspect, an operator can perform simulation operation while being able to intuitively grasp a state of the robot system.

A second aspect of the present disclosure is the robot simulation device (90) of the first aspect in which the image display unit (101) includes a detecting unit (80) that detects a position and an orientation of a head of an operator, the image display unit (101) changing position of a viewpoint for displaying the three-dimensional model, according to the detected position and orientation of the head of the operator.

A third aspect of the present disclosure is the robot simulation device (90A) of the first aspect in which the pseudo three-dimensional object of the three-dimensional model of the robot system displayed by the image display unit (101) is a stereoscopic image reproduced using a hologram representing the three-dimensional model of the robot system.

A fourth aspect of the present disclosure is the robot simulation device (90) of any one of the first to third aspects, further including: a network connection unit (102) for connecting with a robot controller (50) for controlling the robot (30) via a network (60); and a model operation unit (103) that acquires position and orientation data on the robot in operation from the robot controller (50) to operate the three-dimensional model of the robot displayed by the image display unit (101) using the position and orientation data acquired.

A fifth aspect of the present disclosure is the robot simulation device (90) of the fourth aspect, further including: an operation-program acquiring unit (111) that acquires an operation program of the robot from the robot controller (50) ; and an operation program display unit (112) that displays, on the basis of a three-dimensional position of a teaching point included in the operation program acquired, an image showing the teaching point, at a position corresponding to the three-dimensional position of the teaching point in the three-dimensional space.

A sixth aspect of the present disclosure is the robot simulation device (90) of the fifth aspect, further including: an operation-program changing unit (113) that receives operation of changing the teaching point displayed as the image; and an operation-program reflecting unit (114) that updates the operation program according to a position of the teaching point changed, and transmits the operation program updated, along with an implement command of the operation program updated, to the robot controller.

A seventh aspect of the present disclosure is the robot simulation device (90) of any one of the fourth to sixth aspects, further including: a setting acquiring unit that acquires setting information on the robot system from the robot controller; and a setting display unit that displays the setting information acquired as character information in the three-dimensional space.

An eighth aspect of the present disclosure is the robot simulation device (90) of the seventh aspect, further including: a setting changing unit (123) that receives operation of changing the setting information displayed; and a setting reflecting unit (124) that transmits the setting information changed, along with a changing command of the setting information, to the robot controller (50).

A ninth aspect of the present disclosure is the robot simulation device (90) of any one of the fourth to eighth aspects, further including: an operation-state acquiring unit (131) that acquires information on an operation state of the robot system from the robot controller (50); and an operation-state display unit (132) that displays the acquired information on the operation state as character information in the three-dimensional space.

A tenth aspect of the present disclosure is the robot simulation device (901B) of the fourth aspect, being configured as follows: a plurality of systems each including the robot system and the robot controller (50a or 50b) exists; the network connection unit (102) is connected to a plurality of the robot controllers (50a and 50b) via the network (60); the image display unit (101) displays a three-dimensional model of each of the robot systems as the pseudo three-dimensional object existing in the three-dimensional space; the simulation execution unit (141) performs the simulation operation for the three-dimensional model of each of the robot systems; and the model operation unit (103) acquires position and orientation data on the robot in operation, connected to each of the robot controllers, from the robot controllers (50a and 50b), and operates the three-dimensional model of each of the robots using the position and orientation data acquired.

An eleventh aspect of the present disclosure is the robot simulation device (90) of any one of the first to tenth aspects, further including a model-scale changing unit (133) that changes a scale of a display of the three-dimensional model of the robot system.

The invention claimed is:

1. A robot simulation device, comprising:
an image display configured to display a three-dimensional model of a robot system including a robot, a workpiece, and a peripheral device, as a pseudo three-dimensional object existing in a three-dimensional space; and
a processor configured to perform simulation operation for the three-dimensional model of the robot system displayed by the image display,
wherein the image display is further configured to display the three-dimensional model of the robot, the work piece and the peripheral device of the robot system as being superimposed over an image of a real space, at a position corresponding to an actual position of the robot, the work piece and the peripheral device, respectively, in the robot system,
wherein the processor is further configured to:
acquire an operation program of the robot from the robot controller, and
control the image display to display, in the image of the real space,
images showing teaching points, at positions corresponding to respective three-dimensional positions of the teaching points in the robot system, on the basis of the three-dimensional positions of the teaching points included in the acquired operation program,
a path connecting the teaching points,
a first panel showing a list of the teaching points, and
a second panel showing a three-dimensional position of a teaching point selected from one of (i) the list in the first panel and (ii) the images showing the teaching points, wherein
the selected teaching point displayed on the image display is changed in response to at least one of
(1) a movement of a node corresponding to the selected teaching point by a drag operation, or
(2) an input of a numeric value to a third panel including a numeric keypad, the third panel being displayed to be superimposed over the image of the real space in response to a selection of one of coordinates of the three-dimensional position of the selected teaching point in the second panel, and
wherein the processor is configured to operate the model of the robot in a simulated manner in response to a change of the teaching point selected using at least one of the first panel, the second panel or the third panel when all of the first through third panels are displayed together at the same time with the model of the robot on the image display, to enable an operator to check a movement of the model of the robot on the image display before the operation program is transmitted to the robot system.

2. The robot simulation device according to claim 1, wherein
the image display includes a sensor configured to detect a position and an orientation of a head of the operator, and
the image display is configured to change position of a viewpoint for displaying the three-dimensional model, according to the detected position and orientation of the head of the operator.

3. The robot simulation device according to claim 1, wherein
the pseudo three-dimensional object of the three-dimensional model of the robot system displayed by the image display is a stereoscopic image reproduced using a hologram representing the three-dimensional model of the robot system.

4. The robot simulation device according to claim 1, wherein the processor is further configured to:
connect, via a network, with a robot controller for controlling the robot, and
acquire position and orientation data on the robot in operation from the robot controller to operate the three-dimensional model of the robot displayed by the image display using the acquired position and orientation data.

5. The robot simulation device according to claim 4, wherein the processor is further configured to:
receive operation of changing a teaching point among the plurality of teaching points displayed as the images,
update the operation program according to a changed position of the teaching point, and
transmit the updated operation program, along with an implement command of the updated operation program, to the robot controller.

6. The robot simulation device according to claim 4, wherein the processor is further configured to:
acquire setting information on the robot system from the robot controller, and control the image display to display the acquired setting information as character information in the three-dimensional space.

7. The robot simulation device according to claim 6, wherein the processor is further configured to:
receive an operation of changing the displayed setting information, and
transmit the changed setting information, along with a changing command of the setting information, to the robot controller.

8. The robot simulation device according to claim 4, wherein the processor is further configured to:
acquire information on an operation state of the robot system from the robot controller, and
control the image display to display the acquired information on the operation state as character information in the three-dimensional space.

9. The robot simulation device according to claim 4, wherein
the processor is further configured to connect, via the network, with a plurality of systems each including the robot system and the robot controller,
the image display is further configured to display a three-dimensional model of each of the robot systems as the pseudo three-dimensional object existing in the three-dimensional space, and
the processor is configured to:

perform the simulation operation for the three-dimensional model of each of the robot systems, acquire position and orientation data on the robot connected in operation to each of the robot controllers, from the robot controller, and operate the three-dimensional model of each of the robots using the acquired position and orientation data.

10. The robot simulation device according to claim 1, wherein the processor is further configured to change a scale of a display of the three-dimensional model of the robot system.

11. The robot simulation device according to claim 1, wherein the image display comprises a camera configured to acquire the image of the real space, and a sensor configured to estimate a position and an orientation of the camera.

12. The robot simulation device according to claim 1, wherein the processor is further configured to, by performing the simulation operation, create an updated operation program for controlling the robot to perform an actual operation in response to an input of the teaching points to the simulation device.

13. The robot simulation device according to claim 1, wherein the processor is further configured to:

acquire setting information of the robot system from the robot system via a network, and control the image display, which is a head mounted display, to display the acquired setting information by superimposing the setting information on the image of the real space displayed in the head mounted display.

14. The robot simulation device according to claim 13, wherein the processor is further configured to:

receive an operation of changing the setting information, and control the image display to display a sub menu for changing the setting information by the operator of the image display.

15. The robot simulation device according to claim 14, wherein the processor is further configured to:

reflect the changed setting information in the robot system, by transmitting the changed setting information and a changing command to a robot controller of the robot system via the network.

16. The robot simulation device according to claim 15, wherein the processor is further configured to acquire operation states of the robot system from the robot controller via the network, and the operation states include information on an alarm, a production state, a detection result acquired by a camera provided in the robot, a state of a reduction gear.

17. The robot simulation device according to claim 1, wherein the processor is further configured to:

change a scale of the three-dimensional model of the robot, the work piece or the peripheral device of the robot system in response to an operation input by the operator to the robot simulation device, or a gesture operation performed to an operation menu displayed in the real space.

18. The robot simulation device according to claim 1, wherein the selected teaching point displayed on the image display is changed in response to (1) the movement of the node corresponding to the selected teaching point by the drag operation, and the selected teaching point displayed on the image display is changed in response to (2) the input of the numeric value to the third panel including the numeric keypad.

19. The robot simulation device according to claim 18, wherein the second panel is displayed in response to a selection of the teaching point from said one of (i) the list in the first panel and (ii) the images showing the teaching points.

20. The robot simulation device according to claim 1, wherein the second panel is displayed in response to a selection of the teaching point from said one of (i) the list in the first panel and (ii) the images showing the teaching points.

* * * * *